United States Patent
Tsuchiya

[11] 3,716,093
[45] Feb. 13, 1973

[54] WHEELS FOR ROLLING STOCK

[76] Inventor: Shozo Tsuchiya, 160-4, Yugashima, Yugashima-machi, Amagi, Tagata-gun, Japan

[22] Filed: April 22, 1970

[21] Appl. No.: 30,915

[30] Foreign Application Priority Data

July 12, 1969 Japan ................................ 44/66394

[52] U.S. Cl. ................ 152/330, 301/41 W, 152/330
[51] Int. Cl. ............................................. B60b 19/06
[58] Field of Search ........ 301/5 BA, 41 W; 152/330, 152/330 W; 46/155, 201, 202, 41

[56] References Cited

UNITED STATES PATENTS

| | | | |
|---|---|---|---|
| 414,642 | 11/1889 | Herrick | 301/5 BA |
| 2,884,039 | 4/1959 | Hicks | 301/5 BA |
| 2,909,389 | 10/1959 | Wilbor | 301/5 BA |
| 3,230,999 | 1/1966 | Hicks | 152/330 |
| 3,312,265 | 4/1967 | Turner | 152/330 |

*Primary Examiner*—Richard J. Johnson
*Attorney*—George B. Oujevolk

[57] ABSTRACT

A wheel for rolling stock such as a tractor which comprises a wheel rim carrying a pneumatic tire having an annular tire cavity and a plurality of substantially spherical balls having a relatively high density, a packed layer of the ball partly filling the tire cavity. When the axis of the wheel is positioned horizontally, the wheel can have a gravity center at a lower point than the axis thereof due to the presence of the heavy balls positioned at the bottom portion of the tire cavity.

1 Claim, 2 Drawing Figures

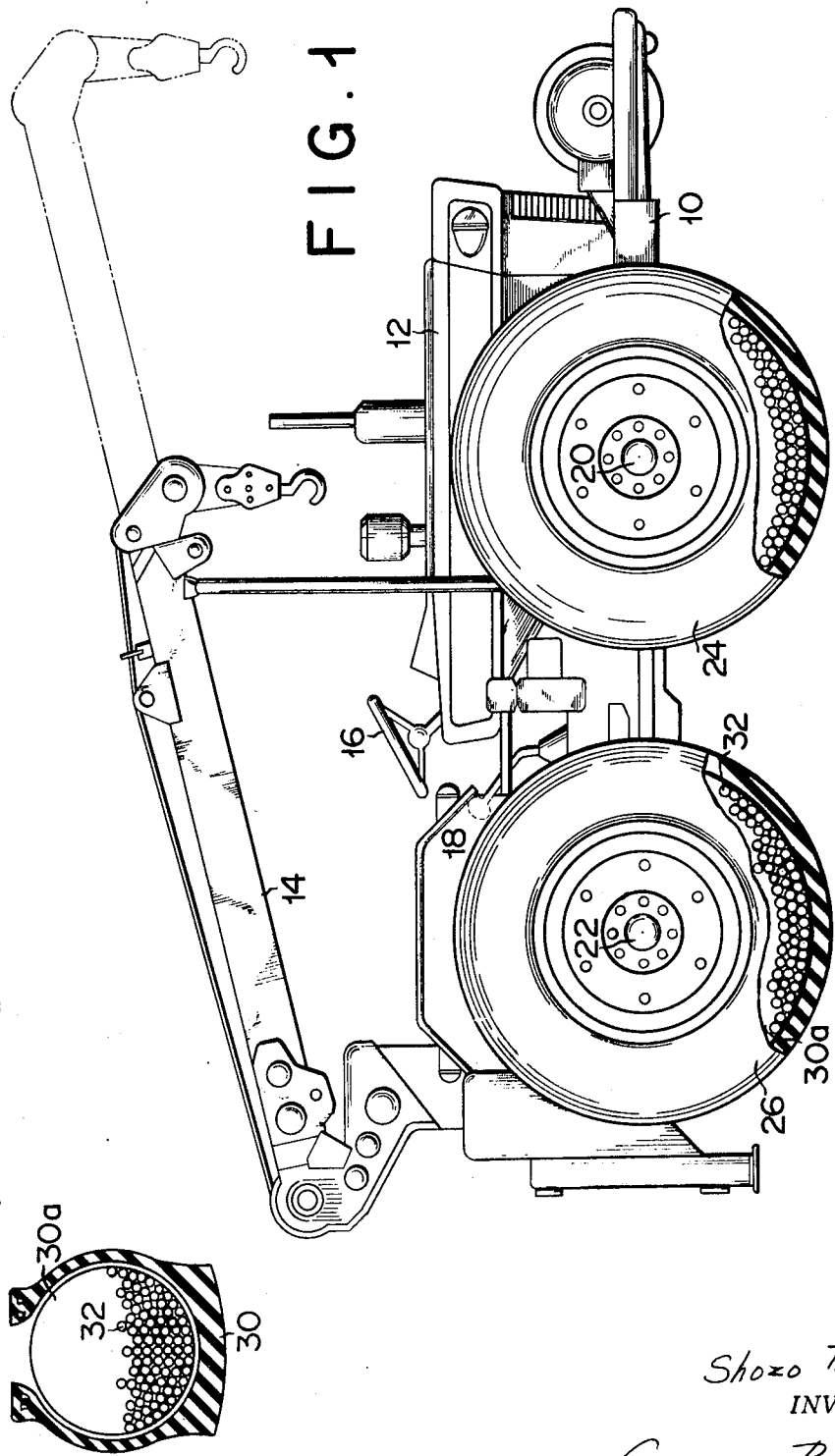

WHEELS FOR ROLLING STOCK

BACKGROUND OF THE INVENTION

The present invention relates to wheels used in various types of rolling stock and more particularly to wheels adapted for use in work rolling stock such as a tractor, crane car or fork lift.

Rolling stock particularly like a tractor is required to have a lower center of gravity than ordinary vehicles such as passenger automobiles in order to travel in a stable state over undulating road surfaces and the vehicle body must be prevented from being inclined or overturned by a great external force to which the said may be unavoidably subjected depending on the type of work which is being performed.

SUMMARY OF THE INVENTION

The present invention provides wheels particularly adapted to be fitted to a work rolling stock such as a tractor. The wheel comprises a wheel rim, a pneumatic tire attached to said rim and a plurality of balls partly filling the cavity of the pneumatic tire. Preferably, the balls may be solid, and consist of metals having a relatively high density such as steel, lead or lead-containing alloys, and are generally about 1 to 3 cm in diameter. It is desired that the total weight of these balls range from a minimum of substantially increasing the weight of a wheel as a whole to such a maximum that when the axis of the wheel is brought to a substantially horizontal position, the upper surface of the packed layer of balls touches the top of the round cross section of that part of an annular tire cavity which successively faces the ground.

Where a wheel containing such balls is fitted to the axle of rolling stock such as tractor, the weight of balls acts on the inside of the bottom of the tire cavity facing the ground, bringing the center of gravity of the wheel to a far lower point than the axial center of the axle. When the wheel rotates, the balls themselves also roll and always tend to move towards the lowest position in the tire cavity, so that a low center of gravity of the wheel is maintained even while it is rotating. Accordingly, a tractor, for example, which is provided with such wheels has its center of gravity far lower than when a weight as heavy as the total weight of the balls is fitted to any other part thereof, and is prominently improved in stability against overturn.

It is accordingly an object of the present invention to provide a wheel for rolling stock which has a center of gravity always brought to a lower position than the axis of the axle of the rolling stock, insofar as it rotates about said axle while it assumes a horizontal or approximately horizontal position. Another object of the invention is to provide rolling stock equipped with such wheels. Since such rolling stock has extremely great resistance to overturn, it can travel very stably even on undulating or inclined ground surfaces.

BRIEF DESCRIPTION OF THE DRAWING

FIG. 1 is a side view of a tractor equipped with wheels according to the present invention, with part of the wheel tires broken away; and FIG. 2 is a cross sectional view of the tire portion of the wheels shown in FIG. 1.

DESCRIPTION OF THE PREFERRED EMBODIMENTS

Referring to FIG. 1, reference numeral 10 generally denotes the frame or chassis of a tractor. At the front part of said frame 10 is disposed an engine case 12, and at the rear part is a support member for supporting a crane 14. Between the engine case 12 and crane support member 14 are arranged a front or steering wheel 16, shift lever 18 and other operating devices. Further, said frame 10 has a front or steering axle 20 connected to the wheel 16 through conventional steering means and a driving axle 22 connected to the output shaft of the engine enclosed in the case 12 through various transmission means. To both ends of the steering axle 20 and driving axle 22 are fitted steering wheels 24 and driving wheels 26, respectively.

The steering wheels 24 and driving wheels 26 may be formed of different construction and/or specification. Since, however, these wheels 24 and 26 are of substantially the same type in this embodiment, only the driving wheels 26 will now be described. The driving wheel 26 comprises a wheel rim and a pneumatic tire 30 fitted to said rim, the cavity 30a of said pneumatic tire 30 being partly filled, as shown in FIG. 2, with numerous balls 32. Said balls 32 preferably consist of a substantially spherical solid form of metal of relatively high density such as steel, lead or lead-containing alloys. Said balls 32 may be prepared from, for example, a spherical form of lead about 18 mm in diameter and weighing about 40 g. Said balls 32 are partly filled into the tire cavity 30a in such amounts that the upper surface of a packed layer of said balls 32 does not touch the top of the circular cross section of that part of the tire cavity 30a successively facing the ground when the axis of the tire 30 is brought to a horizontal position.

It will be apparent that the diameter and amount of balls to be enclosed into the pneumatic tire may be varied over a wide range depending on the dimensions, specification and other factors of the wheel 26 and various requirements for rolling stock which is to be equipped with said wheel 26. While the preferable diameter of the balls 32 is not particularly specified, it generally ranges from about 5 mm to about 50 mm.

When the wheel of the present invention rotates about the shaft of rolling stock held in a substantially horizontal position, the balls 32 received in the tire cavity 30a roll along the inner plane of the tire cavity 30a due to the gravitational force acting thereon and always tend to occupy the lowest part of the tire cavity 30a. Accordingly, the center of gravity of the rolling stock provided with such a wheel is held at a considerably lower position than when a weight as heavy as the total weight of said balls 32 is attached to any other part of the rolling stock. From the standpoint of elevating the righting capabilities of rolling stock to regain its original position with respect to an inclined plane, such a low center of gravity prominently assists said rolling stock in travelling over an inclined or undulating ground surface with great stability. Further, the force exerted by the weight of said balls 32 themselves on the inside of said tire cavity 30a is in turn concentrated on the tread of said tire 30 to increase the a pressure at said tread portion, thereby more effectively preventing the slip of rolling stock and improving its tractive force.

To confirm the advantages of the wheels of the present invention, there were conducted tests so as to define a maximum degree of inclination to be allowed for rolling stock using said wheels. In these tests an ordinary tractor was used having a dead load of about 5,000 Kg mounted on four wheels having the measurements of 16.9 × 30. The two wheels on one side of the tractor body were lifted to determine that angle of inclination at which said tractor body lost its righting capability. A tractor provided with wheels lacking the aforementioned balls indicated a maximum inclination of 43°. On the other hand, a tractor provided with four wheels containing an equal amount of lead balls (18 mm in diameter) whose total weight corresponded to 1 percent of its dead load displayed a maximum inclination of 48°. Where the total weight of said balls accounted for 10 percent and 15 percent of the tractor's dead load, the tractor showed a maximum inclination of 55° and 61°, respectively. These tests prove that the inclusion of a relatively small amount of said balls in the wheels of a tractor noticeably improves its righting capability and that the larger content of said balls prominently increases the speed at which said tractor regains its original position.

The foregoing description relates to the case where the present invention was applied to the wheels of a tractor, but the invention is not limited thereto. It will be apparent that the invention will offer similar advantages where it is employed in various types of work rolling stock travelling at a relatively slow speed, for example, a crane car, fork lift or military armored car.

What is claimed is:

1. A land vehicle having a plurality of wheels, each wheel comprising a wheel rim, and an inflated pneumatic tire attached to said rim and having an annular air cavity of generally circular cross section therein, the radius of said rim being approximately one-half of the radius of said tire, a plurality of dense solid spherical balls within said cavity and occupying substantially one-half of the vertical depth of said cavity cross-section in the lower ground-engaging portion of said tire only, said balls being made of a metal selected from the group consisting of steel, lead, and lead-containing alloys and of a diameter of between 5 mm and 50 mm, said balls being free to roll and move in said cavity and to occupy only the lowest portion thereof, thereby increasing ground pressure of the tire and lowering the center of gravity of said vehicle.

* * * * *